Sept. 10, 1963  H. F. IVEY  3,103,551
FREQUENCY-DEPENDENT ELECTROLUMINESCENT DEVICE
FOR PRESENTING COLORED IMAGES
Filed Dec. 24, 1956  2 Sheets-Sheet 1

INVENTOR.
HENRY F. IVEY.
BY
ATTORNEY.

Sept. 10, 1963 H. F. IVEY 3,103,551
FREQUENCY-DEPENDENT ELECTROLUMINESCENT DEVICE
FOR PRESENTING COLORED IMAGES
Filed Dec. 24, 1956 2 Sheets-Sheet 2
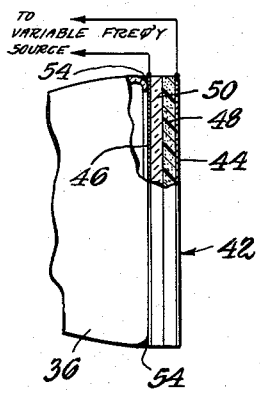
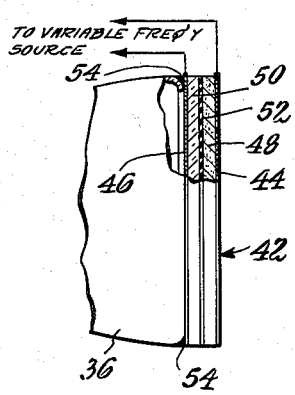
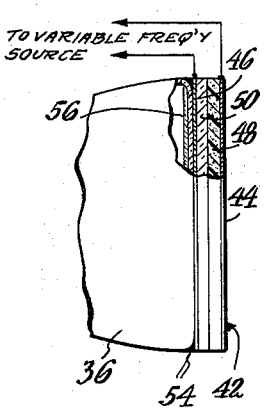
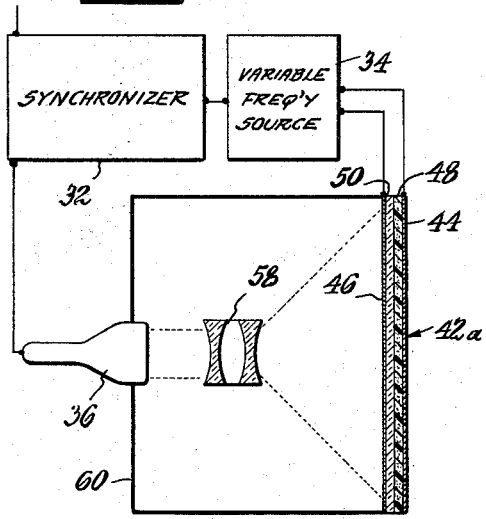
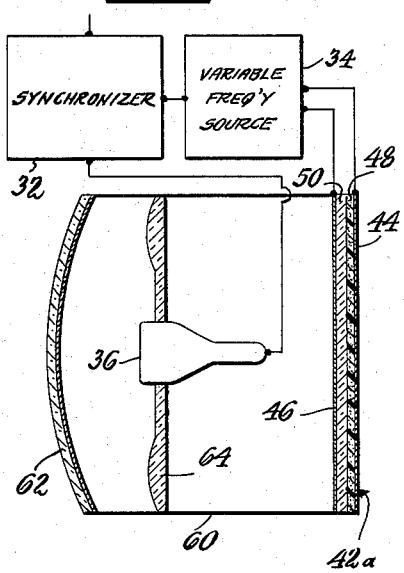
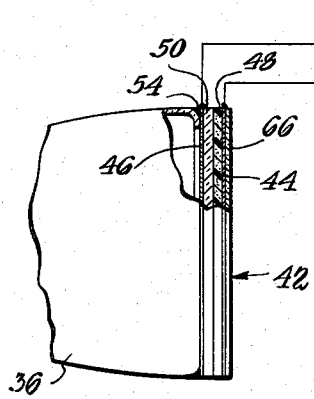
INVENTOR.
HENRY F. IVEY.
BY
ATTORNEY.

United States Patent Office 3,103,551
Patented Sept. 10, 1963

3,103,551
FREQUENCY-DEPENDENT ELECTROLUMINESCENT DEVICE FOR PRESENTING COLORED IMAGES
Henry F. Ivey, Bloomfield, N.J., assignor to Westinghouse Electric Corporation, East Pittsburgh, Pa., a corporation of Pennsylvania
Filed Dec. 24, 1956, Ser. No. 630,356
7 Claims. (Cl. 178—5.4)

This invention relates to electroluminescent devices and methods for operating same and, more particularly, to an electroluminescent device and method wherein two or more signals may be presented simultaneously and in different colors on a viewing screen.

Heretofore there has existed the problem of distinguishing between two different signals which are to be presented simultaneously on a viewing screen, such as a cathode-ray screen. In applications such as loran, this has been overcome by transmitting pulses, for example, at a slightly different frequency so that one pulse will travel with respect to the other pulse when simultaneously presented on the viewing screen. In such a system, however, all signals which appear on the viewing screen are, of course, of the same color. There are other military and non-military applications where it is desirable to be able to distinguish, by color difference, two or more signals which are to be presented simultaneously on a viewing screen, such as a cathode-ray screen. In addition, color television has been faced with a similar problem in the adoption and later rejection of the so-called CBS television system. The features of this CBS color-television system are now very well known and include a mechanical rotating color disc or scanner in front of the receiver, which disc is synchronized with the individual pictures which appear on the raster. As is well known, when the scanning disc is rotated rapidly and synchronized with the color-corresponding images appearing on the raster, the eye will blend the primary-color components of the scanning disc in such a manner as to present a colored picture. The mechanical features of this rotating scanner are extremely objectionable, which when coupled with the incompatibility of the system for black and white resulted in the adoption of the presently-accepted dot-sequential system of color television.

Various methods have been suggested for eliminating the mechanical scanning arrangement at the receiver, such as providing a plurality of phosphor layers on the cathode-ray tube and synchronizing the energy of the exciting cathode rays with the color-corresponding scansions of the phosphor. This allows the electrons to penetrate to varying depths to excite different layers of phosphor material to produce different colors and such systems are described in Patents No. 2,704,783 to Sziklai et al. and No. 2,580,073 to Burton. Such systems are difficult to control with regard to the depth of penetration of the electrons into the phosphor layers. In other systems, the actual external filters are electrically changed in color in synchronization with the application of the color-corresponding scansions, as described in Patent No. 2,727,941 to Fulmer. In still other systems, the phosphor material is selected to be excited to different colors by different frequency X-rays, as described in Patent No. 2,728,010 to Hegyi.

It is the general object of this invention to avoid and overcome the foregoing and other difficulties of and objections to prior-art practices by the provision of a non-mechanical screen for reproducing individual signals in different colors for simultaneous presentation.

It is a further object to provide a system for receiving different signals as well as a system for transmitting and receiving different signals and simultaneously presenting the received signals in preselected different colors directly on a viewing screen.

It is another object to provide a method for operating a device for simultaneously reproducing individual signals in different colors directly on a viewing screen.

It is yet another object to provide a method for operating a system for transmitting and receiving individual signals, which signals can be reproduced simultaneously in different colors directly on a screen.

The aforesaid objects of the invention, and other objects which will become apparent as the description proceeds, are achieved by providing a viewing screen comprising an electroluminescent phosphor material having contiguous therewith a photoconductive material and a means for applying electroluminescent-exciting potentials of different frequency across the phosphor and the photoconductive material. By varying the frequency of electroluminescent excitation, the phosphor material can be made to electroluminesce in two or more colors. By alternately and rapidly exposing the photoconductive material to an excitation signal corresponding to the signals which are to be presented directly on the screen, the electroluminescent phosphor material may be energized to emit light only at that portion of the viewing screen which has applied thereto the excitation signal. By synchronizing the application of the different alternating potentials across the phosphor and photoconductive material with the application of the excitation signals to the photoconductive material so that the two are simultaneously applied, a composite signal presentation in two or more colors may be achieved since the image retention of the eye will not distinguish the rapid alternating electroluminescence by which the different colored signals are displayed. In addition, there has been provided a transmitter and receiver arrangement utilizing the foregoing system for presenting multicolored signals or pictures. A method for operating the receiver and receiver-transmitting arrangement has also been provided.

For a better understanding of the invention, reference should be had to the accompanying drawings wherein:

FIG. 5 is an enlarged view, partly in section, of the screen portion of the cathode-ray tube shown in FIG. 2, illustrating the construction of the electroluminescent cell and photoconductor arrangement;

FIG. 6 is a view corresponding to FIG. 5, but showing an alternative embodiment of the electroluminescent cell and photoconductor arrangement;

FIG. 7 is a view similar to FIG. 5, but showing a further alternative embodiment of the electroluminescent cell and photoconductor arrangement;

FIG. 8 is a view showing an enlarged screen for use with a receiver, for simultaneously presenting different signals, enlarged and in color;

FIG. 9 is a view showing an alternative embodiment of an enlarged screen for simultaneously presenting different signals, enlarged and in color;

FIG. 10 shows yet another alternative embodiment of the electroluminescent cell and photoconductor arrangement, as shown in FIG. 4.

The receiver and the screen system, for example, is adapted for receiving and simultaneously presenting on the same screen, in different colors, two or more different transmitted signals, independent of the intended purpose for such signal presentation. This system, however, is particularly adapted for color television and in one embodiment of the invention it has been so illustrated and will be so described.

Figure 1:
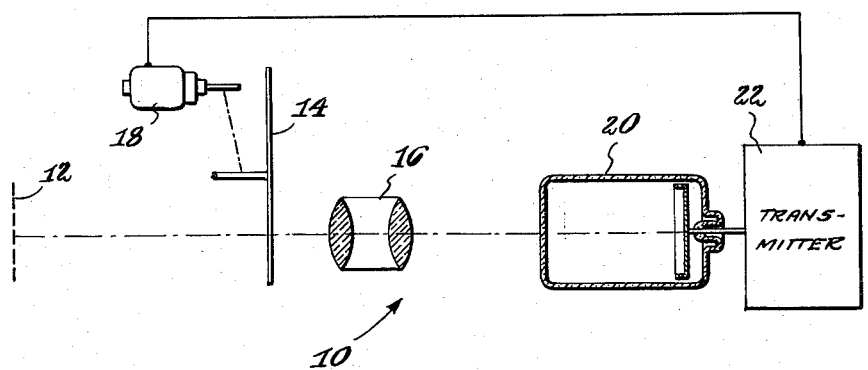
FIG. 1 illustrates in schematic view, a color-television transmitting system.

With specific reference to the form of the invention illustrated in the drawings, the numeral 10 in FIG. 1 indicates a color-television transmitter system. In this system, the object field which is to be transmitted is indicated by the dotted line 12. Light from this object field 12 is successively scanned by a rotating scanning disc 14 which presents to the focusing lens 16 a plurality of rapidly-reoccurring primary-color components of the object field. The scanning disc 14 is composed of a series of filter arrangements for successively filtering out all but the desired primary color component which is to be presented. Normally the primary color components of the object field will be green, blue and red, although these primary color components can be varied, if desired. The scanning disc 14 is driven by a motor 18 at a speed such that flicker in the receiver system will be minimized, such speeds being from 120 to 180 revolutions per second, for example, in the case where the scanning disc 14 has three individual color-filter portions.

The color-scanned object field is projected by the lens 16 onto the scanning tube 20, the output of which is fed into a transmitter 22, shown in block diagram. The motor 18 which drives the scanning disc 14 is synchronized with the transmitter 22 so that the successive scansions which are received by the tube 20 are converted into a transmitted video signal having components which correspond to the successive scansions received by the tube 20. With this transmitted video signal are normally transmitted synchronizing pulses which correspond to the revolutions of the driving motor 18, so that the components of the video signal which corerspond to the successive color scansions are transmitted with the corresponding synchronizing pulses. All of this system is well known in the art and it is generally described in Patent No. 2,304,081 to Goldmark.

Figure 2:
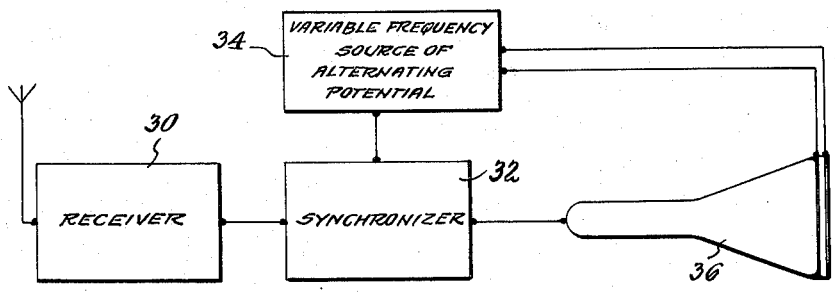
FIG. 2 illustrates in schematic view, a receiving system for receiving two or more signals for simultaneous presentation in different colors on a viewing screen.

In FIG. 2 is shown, in schematic view, the receiver system which may be used to receive the video signal which is transmitted by the transmitter system. In its preferred form, the receiver 30, shown in block diagram, reproduces from said video signal a plurality of successive individual-excitation voltages which correspond to the successive field scansions which are effected at the transmitter. These excitation voltages and the synchronizing pulses are fed into a synchronizer 32, shown in block diagram. A variable frequency source of alternating potential 34 is actuated by the synchronizer 32 so that its output is impressed across the screen of the cathode-ray tube 36 in synchronization with the application of the successive individual signal-excitation voltages which are applied to actuate corresponding cathode-ray scansions of the face of the cathode-ray tube 36. The receiver and synchronizer, as well as all but the face portions of the cathode-ray tube 36, may be generally similar to the so-called CBS color-television receiver.

Figure 3:
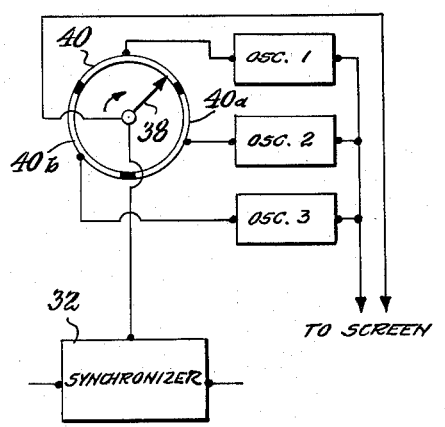
FIG. 3 illustrates a variable-frequency source of potential.

In FIG. 3 is illustrated in schematic form, a variable-frequency source of alternating potential. In the embodiment as shown, a rotating electrical contact 38, whose rotation is synchronized with the rotation of the scanning disc 14, is used to actuate the screen to different colors, as explained hereinafter. Oscillator electrical contacts 40, 40a and 40b are evenly positioned about the periphery of the circle described by the rotation of contact 38 so that each oscillator contact connects its respective oscillator across the screen 42 for slightly less than one-third of the time. It will thus be seen that the foregoing system generally corresponds to the CBS system except that where a red filter, for example, is normally presented in front of the raster, the oscillator 1 will be energized through contact 40. Where the green filter is normally presented in front of the raster in the CBS system, the oscillator 2 will be energized through contact 40a, etc. It should be understood that this mechanical make-and-break may be replaced by an electronic switching system, if desired. If it is desired to present a two-color picture where only two signals are to be presented simultaneously in different colors on the viewing screen, it is obvious that one of the oscillators may be eliminated from the circuit shown in FIG. 3 and the electrical contacts for these two oscillators modified accordingly.

Figure 4:
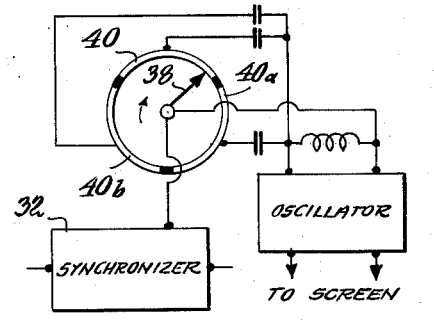
FIG. 4 illustrates an alternative variable-frequency source of potential.

In FIG. 4 is shown an alternative embodiment of the variable-frequency source of alternating potential. This embodiment corresponds to that shown in FIG. 3 except that a single oscillator is used and the oscillator tuning is varied so that the desired frequencies will be produced. Oscillators as may be used in the foregoing variable-frequency sources of potential are well known. An oscillator for a somewhat similar purpose is shown in FIG. 7 of the aforementioned Patent No. 2,727,941 to Fulmer.

In FIG. 5 is shown an enlarged view, partly in section, of the screen or viewing portion 42 of the cathode-ray tube 36. In its simplest form, this screen portion 42 comprises two bounding and spaced electrodes 44 and 46 having sandwiched therebetween a layer of field-responsive electroluminescent phosphor material 48 and a photo-conductive layer 50.

By way of explanation, electroluminescence was first completely disclosed by G. Destriau in London, Edinburgh, and Dublin Philosophical Magazines, series 7, volume 38, No. 285, pages 700–737 (October 1947), article titled "The New Phenomenon of Electrophotoluminescence." In the phenomenon of electroluminescence, selected phosphor materials are placed within the influence of an electric field, such as by sandwiching the phosphor material between two spaced electrodes and applying an alternating potential between these electrodes. The resulting electric field which is created across the electrodes excites the phosphor material to luminescence, and the phosphor materials which display this electroluminescence are thus termed "field responsive." Such phosphor materials are normally admixed with a dielectric material or a separate layer of dielectric material is included between the electrodes in order to prevent any arcing thereacross which would short out the electroluminescent cell, but a separate dielectric material is only desirable and not mandatory for the cells may be operated under some conditions without any dielectric where the applied electric field is as high as 100 kv. per centimeter. Normally the spaced electrodes are parallel, but they need not be, as where graded field intensities are desired.

In the construction shown in FIG. 5, the phosphor material 48 is positioned adjacent the outer electrode 44, which electrode constitutes a viewing face for the screen 42. This electrode 44 is transmissive for the radiations which the field-responsive phosphor is capable of generating when excited to luminescence. As a specific example, the electrode 44 may be formed of an electrically-conductive and light-transmissive layer of tin oxide, which layer may be applied onto a glass foundation plate by means such as described in Patent No. 2,522,531 to Mochel, for example. Other thin light-transmissive and electrically-conductive materials may be substituted for the tin oxide, if desired, such other materials being well known.

In accordance with the teachings of this invention, the phosphor layer 48 should be responsive to fields of different frequencies to produce more than one color. If two different signals are desired to be presented simultaneously in blue and green colors, for example, the phosphor may be zinc sulphide activated by copper and may be prepared by mixing 100 moles of zinc sulphide with 1 mole of copper nitrate and 0.25 mole of zinc chloride, which admixed material may be fired in closed silica tubes at about 950° C. for about one hour. This phosphor will electroluminesce in the green region of the visible spectrum when excited by a field having a frequency of 720 cycles, for example. When excited by a field of a frequency of 10 kcs., for example, the phosphor will respond in the blue region of the visible spectrum. Other two-color phosphors are also available and zinc sulphide which is activated by copper and manganese will respond in the yellow region of the visible spectrum to a field having a frequency of 720 cycles and in the green region of the visible spectrum to a field having a frequency of 10 kcs. If the two different signals are desired to be presented simultaneously in red and green, for example, two different phosphors can be mixed. For example, green-emitting zinc sulphide, copper-activated phosphor which is coactivated with chlorine may be admixed with a red-emitting phosphor such as zinc selenide, activated with copper and coactivated with chlorine. At 720 cycles excitation frequency, for example, this admixture will respond in the green region of the visible spectrum and at 10 kcs. excitation frequency, for example, this admixed phosphor will respond in the red region of the visible spectrum. Such a phosphor admixture is disclosed in co-pending application of Willi Lehmann, S.N. 630,355, titled "Electroluminescent Cell," filed concurrently herewith, and owned by the present assignee, now abandoned. Of course, in all of the foregoing phosphor embodiments, the exciting oscillators as shown in FIG. 3 should be selected so as to produce the desired frequency.

A three-color phosphor is described in co-pending application of Willi Lehmann, S.N. 630,040, titled "Phosphor," filed concurrently herewith, and owned by the assignee of the present application, now Patent No. 2,937,150. Such a phosphor may be prepared by admixing 100 grams zinc sulphide, 1.2 grams manganous acetate, 0.5 gram copper sulphate and 1.5 grams zinc chloride. Thus this phosphor is zinc sulphide, activated by copper and manganese and coactivated with chlorine. The foregoing admixture may be fired in an atmosphere of sulphur vapor for about 1 hour at about 1100° C., after which the phosphor is reground and washed in potassium cyanide solution. This phosphor electroluminesces in the yellow regions of the visible spectrum at lower frequencies (360 cycles, for example), in the green at about 1 kc., and in the blue at about 30 kcs. and higher. Thus this phosphor may be used where different signals are to be presented simultaneously to the viewer in green, blue and yellow colors. Other possible variations for varying the colors in which three signals are to be presented simultaneously will be considered hereinafter.

The term "photoconductive" has been used herein to describe a material whose impedance is decreased or lowered when excited by or irradiated with light or even particle bombardment, such as electrons. The term "electron-bombardment-conductive" is normally used to describe materials whose impedance is lowered when excited by electrons. It is thus clear that the term "photoconductive" as used herein is generic to both radiation-induced conductivity and particle-bombardment-induced conductivity. In addition, the impedance of these photoconductive materials normally decreases with increased excitation, as is well known. Regarding the term "light," it is sometimes given a narrow meaning which refers to electromagnetic energy in the visible spectrum. In a broader sense, however, the term "light" may be used to include X-rays, ultra-violet light, visible light and infra-red light and it is the broader meaning of this term which is used herein.

The layer of photoconductive material 50 and contiguous layer of phosphor material 48 bounded by electrodes has been previously described in many publications and is described in Patent No. 2,650,310 to White, for example. Such a device may be used for a light amplifier and the signals which are to be presented simultaneously in different colors may actually be amplified, if desired, as hereinafter explained. In the operation of these photoconductive and electroluminescent devices, a field is applied across the entire phosphor and photoconductive layer. When the photoconductive layer is not energized, it has a very high impedance and most of the applied electric field will occur across this photoconductive layer with a relatively small electric field appearing across the separate phosphor layer. When the photoconductive layer 50 is energized, as by exciting this layer 50 with cathode rays, for example, its impedance will drop and the most of the applied electric field will manifest itself across the phosphor layer. Since these electroluminescent phosphor materials are field responsive and the brightness increases with increased field intensity, this increased electric field will cause the phosphor material to electroluminesce at that point which is aligned or contiguous with the excited photoconductor portion. This will cause the cathode-ray signal, for example, to be reproduced by the electroluminescing phosphor material. Specific examples of suitable electron-bombardment-conductive materials which may be excited by cathode rays are cadmium telluride, cadmium selenide, cadmium sulfide and anthracene.

Since many photoconductive materials which are excitable by cathode rays to vary in impedance are also excitable by visible light to vary in impedance, it is sometimes desirable to place a layer of light-shielding material between the phosphor 48 and the photoconductive layer 50 in order to prevent optical feedback from the phosphor to the photoconductive layer, which optical feedback would, of course, tend to cause the phosphor layer 48 to "lock-in" and electroluminesce even when the excitation signal was removed. Where a separate layer of light-shielding material is utilized, this layer 52 should be of high electrical resistivity, and such a construction is shown in FIG. 6. If a layer of aluminum were to be utilized as a light shielding means, for example, the conducting nature of this material would cause the entire phosphor layer 48 to electroluminesce whenever a small portion of the photoconductive material 50 was rendered conducting, as this would have the effect of placing the photoconductor in series with the electroluminescent layer 48. As a specific example, a layer 52 of opaque plastic such as opaque polyvinyl chloride may be used between the phosphor layer 48 and the photoconductive layer 50 in order to prevent optical feedback when the photoconductive layer is excited by the light which the phosphor material produces when excited by an electric field. It should be noted that anthracene is only very slightly excited by visible light. If anthracene is used as the photoconductive layer 50 and the phosphor electroluminesces to produce visible light, the shielding layer 52 may normally be dispensed with.

Under some conditions of operation, the light-shielding layer 52 between the phosphor and the photoconductive layers may be dispensed with, even when the photoconductive material is excitable by the radiations produced by the phosphor. For example, the alternating potentials of varying frequency may be interrupted between individual scansions so that they are applied for the period the corresponding screen-excitational signal is simultaneously applied to the photoconductive layer 50. This will cause the electroluminescent phosphor to produce visible radiations which will in turn cause some optical feedback in the photoconductive layer 50 and this will increase the rate at which the light builds up in the electroluminescent layer 48. Before the next individual cathode-ray scansion, the exciting electric field for the electroluminescent phosphor is also removed and the screen will assume a quiescent status before it is again energized by the next scansion. The optical-feedback characteristics which will be present in such a construction may impair the contrast as well as the resolution of the generated signals, but this may not always be objectionable, depending upon the particular application. For many purposes, however, it is desirable to include the light-shielding layer 52 whenever the photoconductive material is excitable by the radiations which are generated by the electroluminescent phosphor, in order to eliminate "lock-in" and so that weak signals are contrasted and the resolution of the signals is as sharp as possible. This is perhaps more important where the signals which are to be displayed on the screen are to be amplified by the light-amplifying potentialities of the screen, since the excitation of the photoconductive layer will then be dominated more by the electroluminescence than by the screen-excitation signal, with resulting impairment of the signal contrast and resolution.

The inner electrode 46 should be electrically-conductive and transmissive to the incident signal excitation which is impressed thereupon to excite the photoconductive layer 50. In the case of excitation by cathode-ray scansions, the electrode 46 may be formed of aluminum which may be deposited by well-known vacuum-metallizing techniques. The cathode-ray tube 36 may be fabricated by the usual techniques except that the screen 42 may be hermetically sealed to the rest of the cathode-ray tube at its periphery 54 by an adhesive such as the well-known epoxy resins.

In the embodiment shown in FIG. 6, the light-shielding layer 52 may also serve the dual purpose of a layer of high dielectric material to prevent electric breakdown across the electrodes and to prevent optical feedback if the photoconductive layer is excitable by the radiations produced by the phosphor. Alternatively, the phosphor and dielectric material, which may be a suitable high-dielectric plastic material such as light-transmitting polyvinyl-chloride acetate, for example, may be admixed. The phosphor and admixed dielectric may be used in equal parts by weight, for example, although these proportions may be varied considerably. If the phosphor and dielectric material are admixed, the phosphor-dielectric layer may have a thickness of about 3 mils, for example, and if the phosphor is not admixed with the dielectric, it may have a thickness of about 2 mils, for example. Such phosphor and phosphor-dielectric constructions will normally be suitable for operation under the applied voltages, as hereinafter specified. Of course, all of the material of the screen 42 which is located between the outer electrode 44 and the phosphor portion 48 of the screen should be transmissive for the radiations which are generated by the phosphor when it electroluminesces.

In order for the phosphors to display the different desired colors, the excited portions of the photoconductive layer should conduct for a period of at least one-half cycle of the exciting electric field. This may be accomplished by the proper selection of photoconductors, for example, or by the proper selection of the phosphors which may be used to excite the photoconductors, as described hereinafter, with particular regard to their decay characteristics. This means that either the last portion of each cathode-ray scansion may be sacrificed or the exciting field must be continued for a short time after individual cathode-ray scansion is completed. Also, when using exciting electric fields of very high frequencies in order to produce the different colors in the phosphor, the decay characteristics for the photoconductor or exciting phosphor are a secondary consideration.

It may be desirable for some uses to construct the cathode-ray tube 36 in the usual fashion so that a layer of visible-light-producing phosphor material 56 is carried on the end of the tube and is scanned by the cathode rays. Such a construction is shown in FIG. 7 and zinc silicate-manganese activated phosphor is suitable for this purpose. The visible images which are produced by this phosphor 56 may be used to excite the viewing screen 42 which may be affixed either to the interior or to the exterior of the face of the cathode-ray tube 36. In such an embodiment the inner electrode 46 may also be tin oxide and the photoconductive material may be cadmium sulfide.

In FIG. 8 is illustrated an embodiment wherein the light signals which are produced on the face of the cathode ray tube 36 are projected by means of a lens system 58 onto an enlarged screen 42a. Such an embodiment is constructed as indicated hereinbefore except that the variable frequency source of alternating potentials is connected across the enlarged screen 42a and the application of the potentials to the screen 42a is synchronized with the excitation signals which are imposed on the photoconductive portion 50 of the screen 42a. If the photoconductive material is excitable by visible light, it is desirable to shield the photoconductive material from unwanted light by means of a shielding enclosure 60. Of course, the inner electrode 46 should be transmissive for the screen excitation signals and tin oxide is suitable for this purpose.

It may be desirable to generate ultraviolet radiations by the cathode-ray scansions and phosphors which are excitable by cathode rays to produce ultraviolet light are zinc pyrophosphate or cerium-activated strontium orthophosphate, for example. In such an embodiment, all of the vitreous or other material which is positioned between the phosphor and the photoconductive material should be ultra-violet transmissive, such vitreous materials being quartz or Vycor, for example. Anthracene is a photoconductive material which is excitable by ultraviolet light and not by visible light and in such an embodiment, the light-shielding enclosure 60 can be dispensed with.

Alternatively, it may be desired to excite the phosphor which is coated onto the face of the cathode-ray tube 36 to produce infrared radiation. This infrared radiation can then be projected onto the large viewing screen 42a. A photoconductive material which is excitable by infrared radiation and not by visible light is cadmium telluride and in such an embodiment, the light-shielding enclosure 60 can be dispensed with. Cathode-ray responsive phosphors which will generate infrared radiations and which may be coated onto the face of the cathode-ray tube 36 are zinc sulphide activated by iron or cadmium sulphide activated by copper, for example.

In FIG. 9 is shown an alternative embodiment of an enlarged screen arrangement, as shown in FIG. 8. This alternative embodiment is identical with FIG. 8 except that the lens system 58 as used for enlarging the screen-excitation signal, is replaced by a Schmidt-type spherical mirror or reflector 62. Such mirrors are well known and may be pressed from plastic or metal and rendered highly reflective for visible, infrared or ultraviolet light by vacuum-metallizing a thin coating of aluminum over the reflector surface. Other than this, the embodiment shown in FIG. 9 is similar to the embodiment shown in FIG. 8. As is well known, the Schmidt mirror 62 may be corrected for spherical aberration by an additional glass-correcting member 64, placed between the mirror 62 and the inner electrode 46 of the screen 42a.

Summarizing the general operation of the foregoing system, it will be seen that there has been provided a transmitter arrangement wherein an object field is scanned in a plurality of successive field scansions corresponding to the primary color components of the object field. These scansions are converted into a video signal. The video signal is transmitted to the receiver where it is converted to successive individual screen-excitation signals which correspond to the successive field scansions effected at the transmitter. These successive screen-excitation signals may take the form of infrared images, ultraviolet images, visible light images, or cathode-ray scansions and these successive individual screen-excitation signals are projected in an incident fashion onto a photoconductive material. This screen-excitation signal lowers the impedance of that portion of the photoconductive material where it strikes, with the degree of impedance variation normally increasing with the intensity of the excitation signal. This in turn allows that portion of the phosphor screen which is contiguous with the excited photoconductive material to electroluminesce to reproduce the signals. The electroluminescent phosphor material is capable of being energized to a plurality of different colors corresponding to the different colors in which the signals are to be presented. The application of the alternating potential of that frequency which will energize the electroluminescent material to the desired color is synchronized with the application of the color-corresponding screen-excitation signal to the photoconductive portion of the screen. The signals are thus reproduced simultaneously in a plurality of individual colors since the eye blends together the rapidly-applied signals.

In operating the embodiments as illustrated, the voltages which are applied across the electrode 44 and 46 may be 500 volts, for example, although these voltages may be varied considerably depending upon the signal brightness which is desired. Such applied voltages normally will result in some degree of signal amplifications; that is, the signals which are reproduced in different colors will be brighter than if a phosphor were to be excited by cathode-ray scansions alone, for example. If it is not desired to amplify the signals, the voltage which is applied across the electrodes may be reduced in an amount which will vary with the phosphor materials which are used, the type of photoconductive material which is used and the general constructional details of the screen 42. As a general rule, however, 100 volts applied across the electrodes will result in signal reproduction without amplification.

In the foregoing specific examples, a three-color phosphor is disclosed which will electroluminesce in the yellow, green and blue regions of the visible spectrum, when excited by alternating potentials of different frequencies. It may be desired to produce red, green and blue signals instead of yellow, green and blue signals. In this case a filter 66 may be placed across the front of the viewing screen 42 and such an embodiment is shown in FIG. 10. This filter desirably cuts out only those radiations having a wavelength of from about 5700 A.U. to about 6100 A.U. The yellow color which is produced by the phosphor, as hereinbefore specified, is quite rich in red radiations and when the yellow radiations are filtered out, the phosphor will be generally red-emitting in nature. Suitable interference filters will meet these requirements, as is well known. In the event the filter arrangement is utilized to pass the red radiations and screen out most of the undesirable yellow radiations, it may be desirable to increase the brightness of the phosphor material when it is electroluminescing at the lower "red-producing" frequencies, in order that the "lost radiations" which are screened by the filter may be made up, so that the phosphor will electroluminesce at approximately the same brightness when energized at varying frequencies. Also, accentuating certain colors is sometimes desirable. This increased brightness at individual excitation frequencies may be accomplished in several ways, such as increasing the voltage which the corresponding oscillator will apply across the electroluminescent cell. Alternately, an inductance may be placed in series with the electroluminescent screen 42 and this arrangement is shown in FIG. 10. Inductances in series with electroluminescent cells are disclosed in co-pending application of Willi Lehmann, S.N. 611,663, filed September 24, 1956, titled "Electroluminescent Cell Combination," and owned by the present assignee and the desired value of such inductances may be readily caluculated as disclosed therein. As a specific example, for a cell having an area of 1000 sq. centimeters, ($C$=about 0.1 $\mu$f.) an inductive reactance of 195 millihenries will produce a series resonance condition at about 360 cycles. This will result in increasing, at series resonance, the applied voltage across the cell by from 3 to 6 times that voltage which is supplied by the alternating potential source. This in turn will increase the brightness across the cell only at those frequencies at which resonance exists.

In the foregoing television-transmitter arrangement, an entire object field has been scanned and thereafter reproduced. In some applications, it may be desirable to scan only a portion of an object field and reproduce only this scanned portion. Individual portions of an object field may then be compositely presented. Also, in the foregoing receiver embodiment, the electron-beam scansions which comprise the individual signals may be interlaced, if desired.

The receiver system as described is adapted to receive and present synchronized signals. It should be clear that unsynchronized signals may be received and then synchronized by the receiver before presentation. In addition, the same object field may be presented compositely in different forms and in different colors. For example, TV and radar pictures, radar "PPI" and infrared pictures or infrared and TV pictures of the same object field may be presented simultaneously and in different colors.

Depending on the decay characteristics of the photoconductor or the decay characteristics of a phosphor, the output of which may be used to excite the photoconductor, it may be desirable in some cases to augment the memory aspects of the "exciting" phosphor or the photoconductor, which "memory aspects" are introduced by the decay characteristics. This may be accomplished by utilizing the optical feedback "lock-in" characteristics which are present when the light-shielding means between the photoconductor and the electroluminescent phosphor are eliminated. In such an embodiment, the electroluminescent voltages may be sufficiently low during an individual scansion so that the applied signal will produce "lock-in," but only a very weak light. After the scansion is complete, a strong exciting field may be applied for a period of at least one-half cycle of the exciting field, for example, to cause the impressed signal to electroluminesce very brightly. All exciting fields may then be removed and the phosphor-photoconductor allowed to become quiescent before the next scansion. Other methods for achieving additional memory characteristics, where desired, are also available.

For some applications it may be desirable to eliminate all contrast between individual portions of individual signals and this may be achieved by utilizing the foregoing memory characteristics which are present during "lock-in" and continuing the strong exciting electric field after the cathode-ray scansion for a sufficient time that contrast between individual portions of individual signals is eliminated.

It will be recognized that the objects of the invention have been achieved by providing a screen and receiver and receiver-transmitter arrangement wherein individual signals may be simultaneously presented in different colors. Also, a method for operating the receiver and the receiver-transmitter arrangement has been provided.

While in accordance with the patent statutes one best-known embodiment of the invention has been illustrated and described in detail, it is to be particularly understood that the invention is not limited thereto or thereby.

I claim:

1. A system for receiving different signals and simultaneously presenting such received signals in preselected different colors on a screen, comprising signal-converting means for converting said received signals into a plurality of individual screen-excitation signals corresponding to said received signals, a presentation screen comprising two bounding and spaced electrodes having sandwiched therebetween electroluminescent phosphor material, a photoconductive layer also sandwiched between said bounding electrodes and adjacent one of said electrodes, said one electrode which is adjacent said photoconductive layer positioned to receive incident thereon said plurality of screen-excitation signals, said one electrode also being electrically conductive and transmissive to said screen-excitation signals, said photoconductive layer having the characteristic of being responsive to the said screen-excitation signals received by said one electrode to decrease in impedance, said phosphor characterized by capability of energization by preselected different frequency electric fields to electroluminesce in a plurality of different colors corresponding to said preselected different signal colors, said other bounding electrode formed of light-transmitting and electrically-conductive material, all of said screen material between said phosphor and said other electrode being light transmitting, alternating potential supply means for supplying potentials of preselected different frequencies across said bounding electrodes to create therebetween electric fields which correspond in frequency to those to which said phosphor material responds to electroluminesce in said different colors, and means for synchronizing the application of said individual screen-excitation signals to said one electrode and the supply of said potential across said bounding electrodes so that there is simultaneously supplied across said bounding electrodes that alternating potential having such frequency as can cause said phosphor to electroluminesce in that color which is preselected for screen presentation of that received signal which has corresponding thereto the individual screen-excitation signal which is then applied to said one electrode, whereby said different received signals are simultaneously presented on said screen in preselected different colors.

2. A system for receiving different signals and simultaneously presenting such reeived signals in preselected different colors on a screen, comprising signal-converting means for converting said received signals into a plurality of individual screen-excitation signals corresponding to said received signals, a presentation screen comprising two bounding and spaced electrodes having sandwiched therebetween electroluminescent phosphor material, a photoconductive layer also sandwiched between said bounding electrodes and adjacent one of said electrodes, high-resistance shielding means between said phosphor and said photoconductive layer when said photoconductive layer is excitable by visible light for preventing optical feedback from said phosphor to said photoconductive layer, said one electrode which is adjacent said photoconductive layer positioned to receive incident thereon said plurality of screen-excitation signals, said one electrode also being electrically conductive and transmissive to said screen-excitation signals, said photoconductive layer having the characteristic of being responsive to the said screen-excitation signals received by said one electrode to decrease in impedance according to the intensity of said one electrode-received screen-excitation signals, said phosphor characterized by capability of energization by preselected different frequency electric fields to electroluminesce in a plurality of different colors corresponding to said preselected different signal colors, said other bounding eelctrode formed of light-transmitting and electrically-conductive material, all of said screen material between said phosphor and said other electrode being light transmitting, alternating potential supply means for supplying potentials of preselected different frequencies across said bounding electrodes to create therebetween electric fields which correspond in frequency to those to which said phosphor material responds to electroluminesce in said different colors, and means for synchronizing the application of said individual screen-excitation signals to said one electrode and the supply of said potential across said bounding electrodes so that there is simultaneously supplied across said bounding electrodes that alternating potential having such frequency as can cause said phosphor to electroluminesce in that color which is preselected for screen presentation of that received signal which has corresponding thereto the individual screen-excitation signal which is then applied to said one electrode, whereby said different received signals are simultaneously presented on said screen in preselected different colors.

3. A system for receiving different signals and simultaneously presenting such received signals in preselected different colors on a screen, comprising signal-converting means for converting said received signals into a plurality of individual screen-excitation light signals corresponding to said received signals, means for enlarging said individual screen-excitation light signals, a presentation screen comprising two bounding and spaced electrodes having sandwiched therebetween electroluminescent phosphor material, a photoconductive layer also sandwiched between said bounding electrodes and adjacent one of said electrodes, a high-resistance shielding means between said phosphor and said photoconductive layer when said photoconductive layer is excitable by visible light for preventing optical feedback from said phosphor to said photoconductive layer, said one electrode which is adjacent said photoconductive layer positioned to receive incident thereon said plurality of enlarged screen-excitation light signals, said one electrode also being electrically conductive and transmissive to said enlarged screen-excitation light signals, said photoconductive layer having the characteristic of being responsive to the said enlarged screen-excitation light signals received by said one electrode to decrease in impedance according to the intensity of said one electrode-received enlarged screen-excitation light signals, said phosphor characterized by capability of energization by preselected different frequency electric fields to electroluminesce in a plurality of different colors corresponding to said preselected different signal colors, said other bounding electrode formed of light-transmitting and electrically-conductive material, all of said screen material between said phosphor and said other electrode being light transmitting, alternating potential supply means for supplying potentials of preselected different frequencies across said bounding electrodes to create therebetween electric fields which correspond in frequency to those to which said phosphor material responds to electroluminescence in said different colors, and means for synchronizing the application of said individual enlarged screen-excitation light signals to said one electrode and the supply of said potential acros said bounding electrodes so that there is simultaneously supplied across said bounding electrodes that alternating potential having such frequency as can cause said phosphor to electroluminesce in that color which is preselected for screen presentation of that received signal which has corresponding thereto the individual enlarged screen-excitation light signal which is then applied to said one electrode, whereby said different received signals are simultaneously presented on said screen in preselected different colors.

4. In a color television system: a transmitter which comprises scanning means for succesively scanning an object field, color means associated with said scanning means for successively presenting a plurality of reoccurring primary color components of said object field to said scanning means during respective field scansion periods, transmitter converting means associated with said scanning means for converting said scansions into a video signal having components which correspond to said successive scansions; a receiver for converting said video signal into a color picture and comprising, video signal-converting means for converting said video signal into a plurality of individual screen-excitation signals which correspond to the transmitter-scansion-components of said video signal, a presentation screen comprising two bounding and spaced electrodes having sandwiched therebetween electroluminescent phosphor material, a photoconductive layer also sandwiched between said bounding electrodes and adjacent one of said electrodes, said one electrode which is adjacent said photoconductive layer positioned to receive incident thereon said plurality of screen-excitation signals, said one electrode also being electrically conductive and transmissive to said screen-excitation signals, said photoconductive layer having the characteristic of being responsive to the said screen-excitation signals received by said one electrode to decrease in impedance according to the intensity of said electrode-received screen-excitation signals, said phosphor characterized by capability of energization by preselected different frequency electric fields to electroluminesce in a plurality of different colors corresponding to said preselected different signal colors, said other bounding electrode formed of light-transmitting and electrically-conductive material, all of said screen material between said phosphor and said other electrode being light transmitting, alternating potential supply means for supplying potentials of preselected different frequencies across said bounding electrodes to create therebetween electric fields which correspond in frequency to those to which said phosphor material responds to electroluminesce in different colors, and means for synchronizing the application of said individual screen-excitation signals to said one electrode and the supply of said potential across said bounding electrodes so that there is simultaneously supplied across said bounding electrodes that alternating potential having such frequency as can cause said phosphor to electroluminesce in the color of that transmitter-scansion-component of the received video signal which has corresponding thereto the individual screen-excitation signal which is then applied to said one electrode.

5. The method of reproducing individual signals in different colors in composite fashion on a screen comprising separate layers of photoconductor material and electroluminescent phosphor material, which phosphor material layer when individually energized by alternating electric fields of predetermined intensities and predetermined frequencies will display the different colors in which said signals are to be reproduced, which method comprises, individually exposing said photoconductive material layer to each of said signals to decrease the impedance of exposed portions of said photoconductive material layer, and separately applying in synchronized fashion each of said predetermined electric fields across said screen phosphor and photoconductive material layers so that the individual exposure of any one of said signals onto said photoconductive material layer occurs simultaneous with the application across said phosphor and photoconductive material layers of that predetermined electric field which produces electroluminescent emission of the color in which the signal then exposed onto said photoconductive layer is to be displayed.

6. The method of reproducing individual signals in different colors in composite fashion on a screen comprising separate layers of photoconductor material and electroluminescent phosphor material, which phosphor material layer when individually energized by alternating electric fields of predetermined intensities and predetermined different frequencies will display the different colors in which said signals are to be reproduced, which method comprises, sequentially exposing said photoconductive material layer to each of said signals to decrease the impedance of signal-exposed portions of said photoconductive material layer, and sequentially applying in synchronized fashion each of said predetermined alternating electric fields across said screen phosphor and photoconductive material layers so that the exposure of any one of said signals onto said photoconductive material layer occurs simultaneous with the application across said phosphor and photoconductive material layers of that predetermined electric field which produces electroluminescent emission of the color in which the signal then exposed onto said photoconductive material layer is to be displayed.

7. The method of reproducing individual signals in different colors in composite fashion on a screen comprising separate layers of photoconductor material and electroluminescent phosphor material, which phosphor material layer when individually energized by alternating electric fields of predetermined intensities and predetermined different frequencies will display the different colors in which said signals are to be reproduced, which method comprises, individually and sequentially exposing said photoconductive material layer to each of said signals to decrease the impedance of exposed portions of said photoconductive material layer in an amount corresponding to the intensity of said signals, and individually and sequentially applying in synchronized fashion each of said predetermined alternating electric fields across said screen phosphor and photoconductive material layers so that the exposure of any one of said signals on to said photoconductive material layer occurs simultaneous with the application across said phosphor and photoconductive material layers of that predetermined electric field which produces electroluminescent emission of the color in which the signal then exposed onto said photoconductive material layer is to be displayed.

References Cited in the file of this patent

UNITED STATES PATENTS

| | | |
|---|---|---|
| 2,728,815 | Kalfaian | Dec. 27, 1955 |
| 2,773,216 | Edmonds | Dec. 4, 1956 |
| 2,780,731 | Miller | Feb. 5, 1957 |
| 2,792,447 | Kazan | May 14, 1957 |
| 2,858,363 | Kazan | Oct. 28, 1958 |
| 2,861,206 | Fiore et al. | Nov. 18, 1958 |
| 2,881,353 | Michlin | Apr. 7, 1959 |
| 2,892,095 | Orthuber et al. | June 23, 1959 |
| 2,900,555 | Schneeberger | Aug. 18, 1959 |
| 2,928,980 | Williams | Mar. 15, 1960 |

FOREIGN PATENTS

| | | |
|---|---|---|
| 157,101 | Australia | June 16, 1954 |

OTHER REFERENCES

Proceedings I.R.E., December 1955, page 1918.